J. HAYWARD.
EXCAVATING APPARATUS.
APPLICATION FILED JUNE 9, 1908.
946,899.
Patented Jan. 18, 1910.
5 SHEETS—SHEET 1.
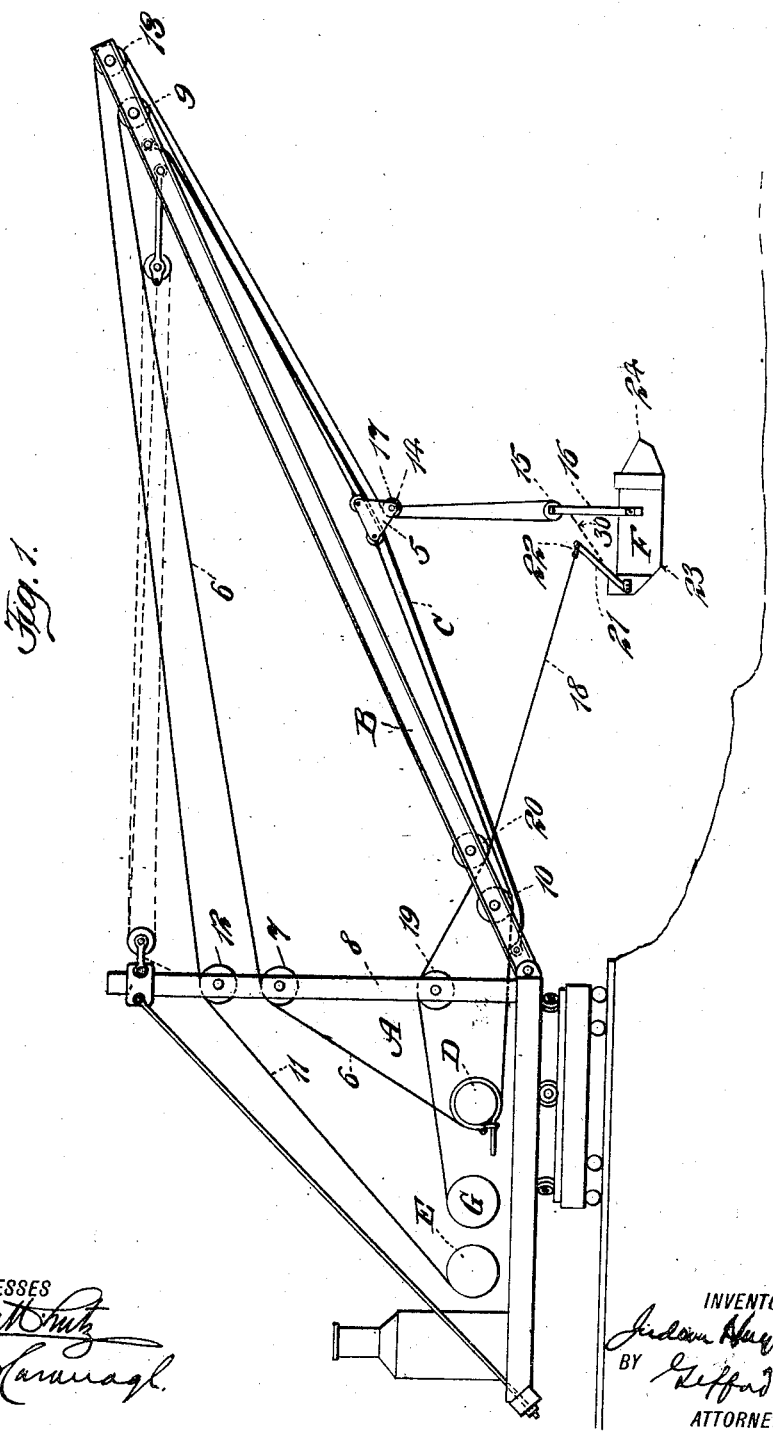

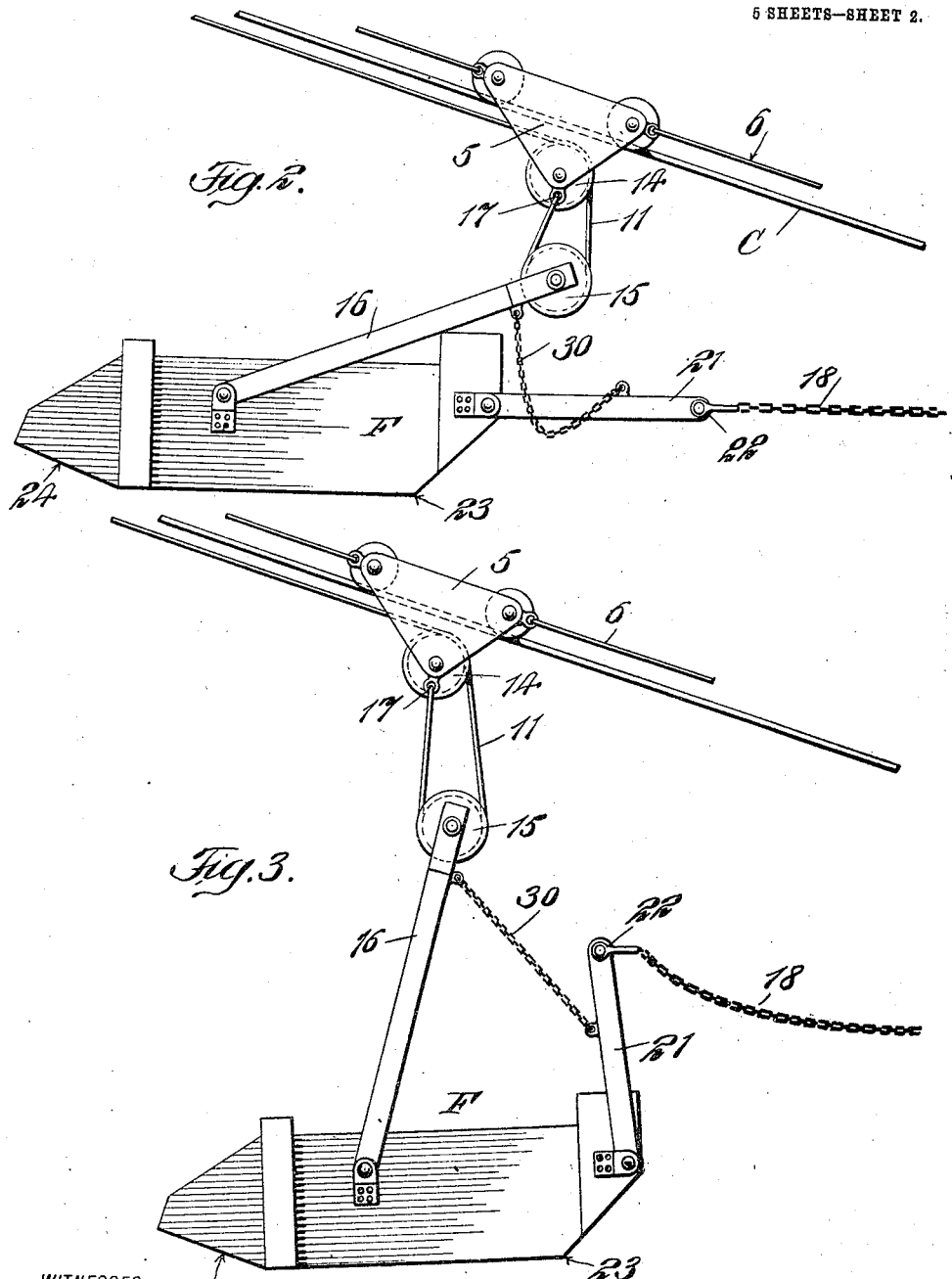

J. HAYWARD.
EXCAVATING APPARATUS.
APPLICATION FILED JUNE 9, 1908.
946,899.
Patented Jan. 18, 1910.
5 SHEETS—SHEET 3.
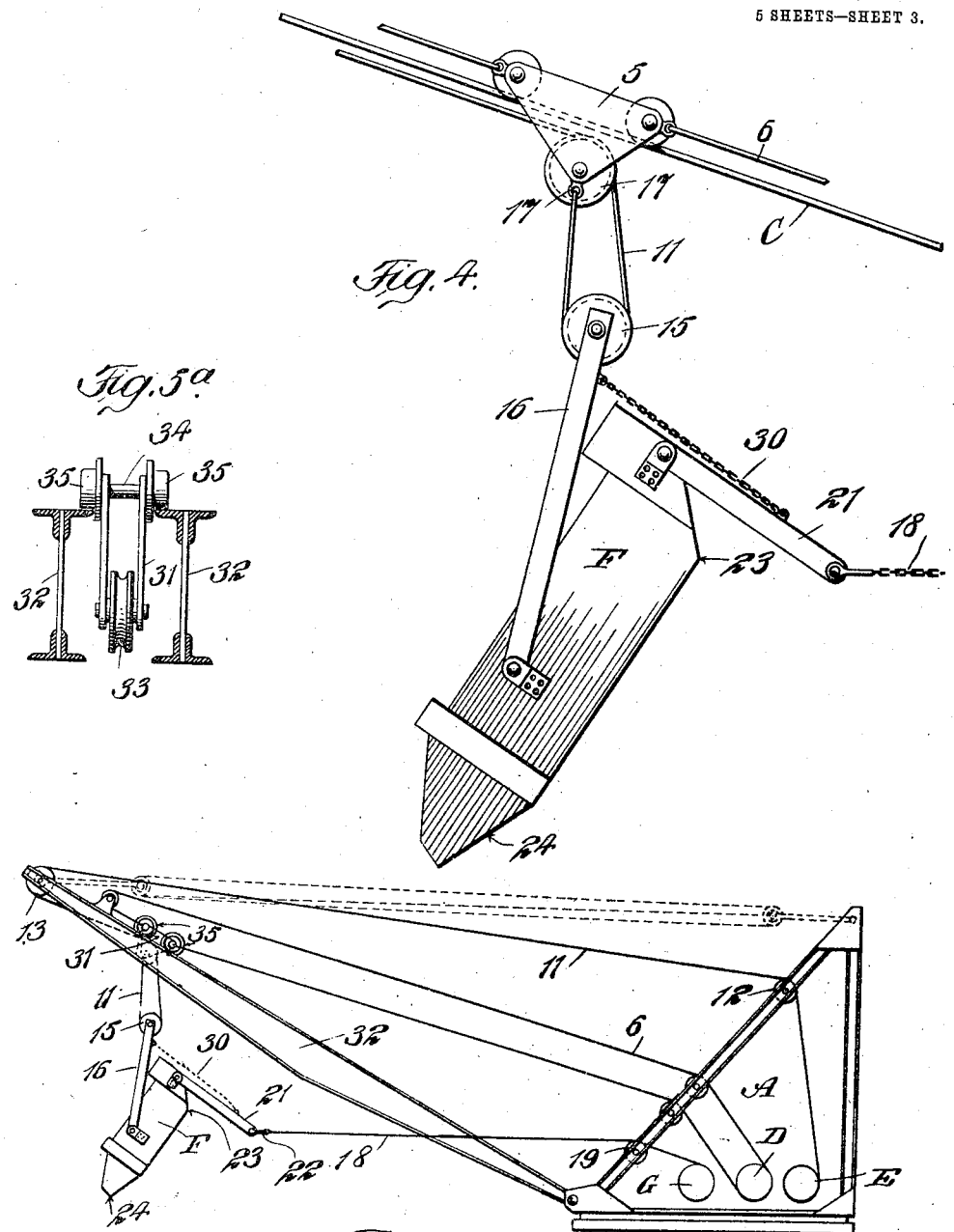

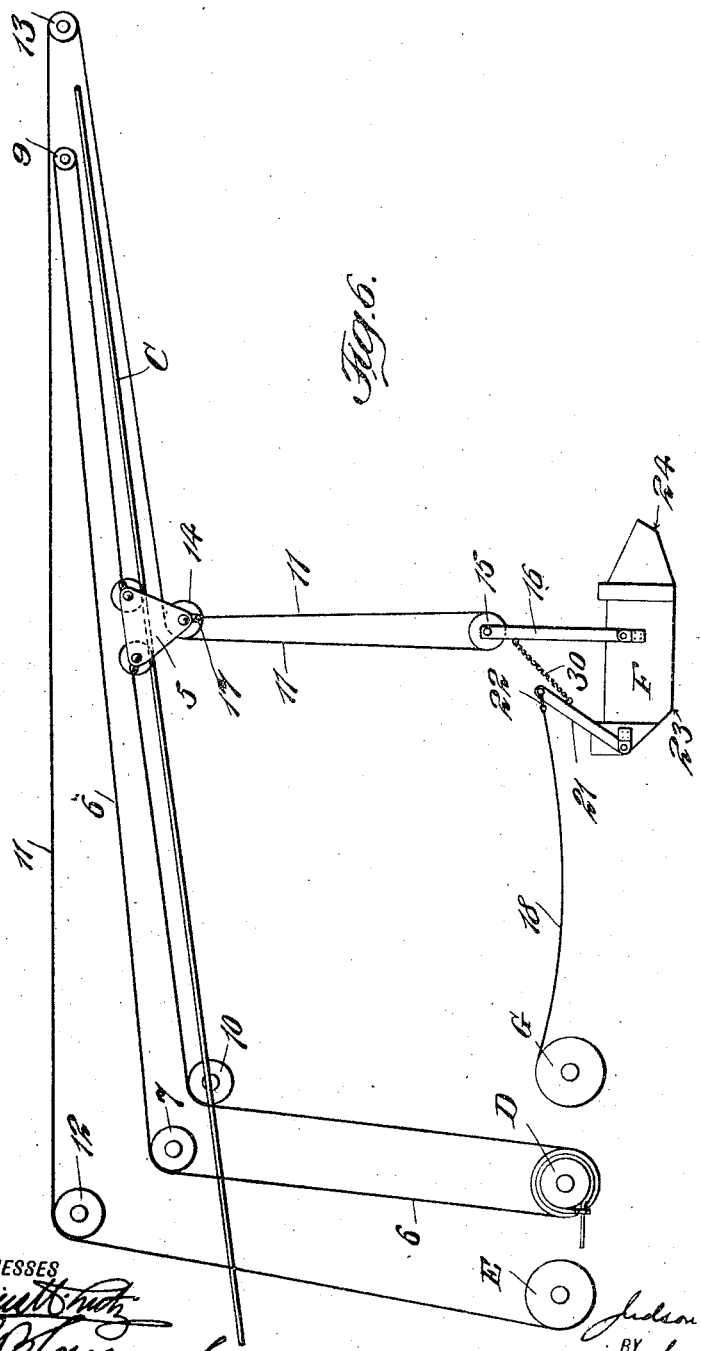

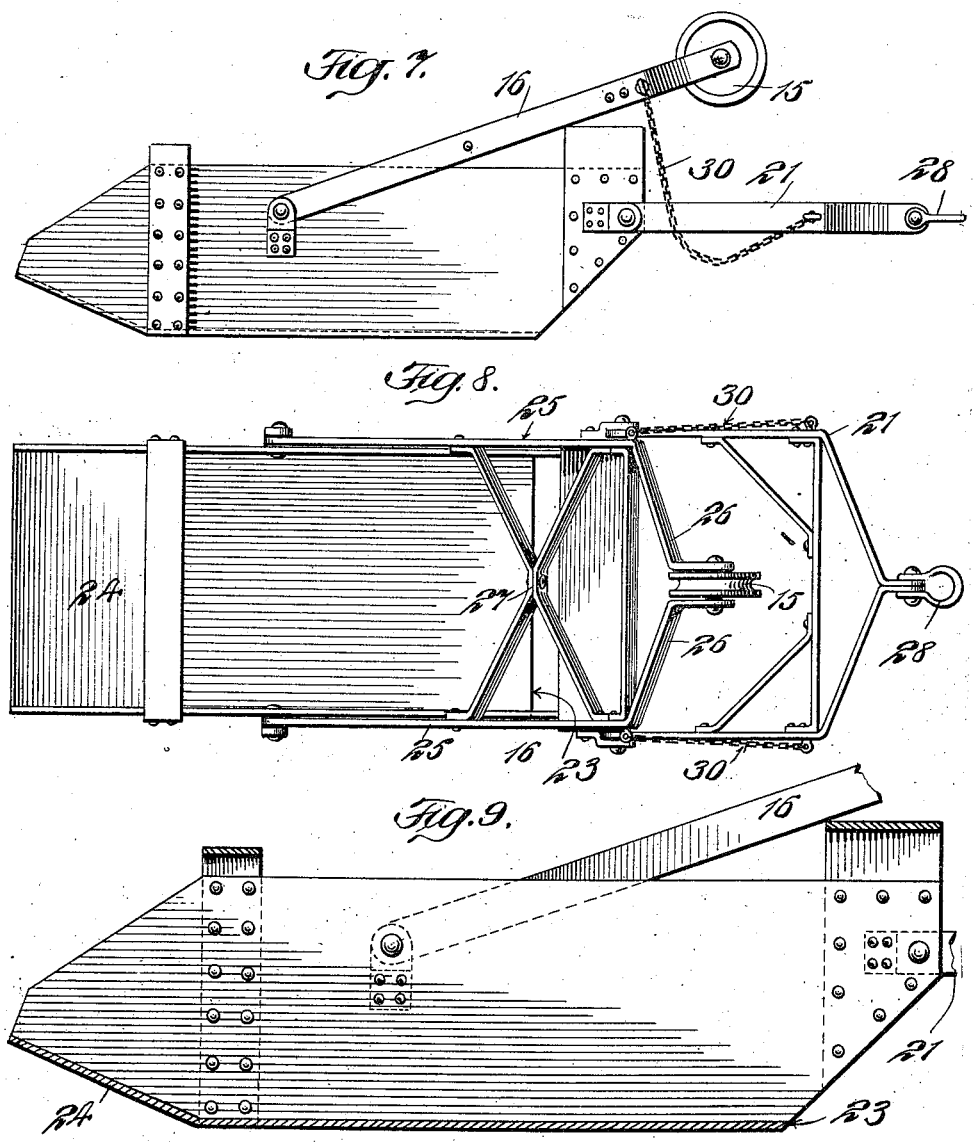

UNITED STATES PATENT OFFICE.

JUDSON HAYWARD, OF NORTH HACKENSACK, NEW JERSEY.

EXCAVATING APPARATUS.

946,899.

Specification of Letters Patent. Patented Jan. 18, 1910.

Application filed June 9, 1908. Serial No. 437,478.

*To all whom it may concern:*

Be it known that I, JUDSON HAYWARD, a citizen of the United States, and a resident of North Hackensack, in the county of Bergen and State of New Jersey, have invented certain novel and useful Improvements in Excavating Apparatus, of which the following is a specification.

This invention relates to certain novel and useful improvements in excavating apparatus, and in the present instance it is my purpose to provide an apparatus of the type referred to embodying features of simplicity, durability, strength and economy in the cost of production and operation.

The invention consists in the construction, combination and arrangement of parts set forth in and falling within the scope of the appended claims.

In the accompanying drawings,—Figure 1 is a view in side elevation of an apparatus embodying my improvements; Fig. 2 is a detail view of the excavating shovel showing the same in position to be loaded by hauling on the loading and dumping line; Fig. 3 is another view of the shovel showing the same in position to be hoisted after being loaded; Fig. 4 shows the shovel in dumping position; Fig. 5 is a view of a modified form of apparatus, in this instance the trolley of the shovel traveling upon a rigid boom instead of upon a cable as is shown in Fig. 1; Fig. 5ª is a cross section of the rigid trackway shown in Fig. 5; Fig. 6 is a diagrammatical view showing the rope lead of my preferred form of apparatus; Fig. 7 is a detail view in side elevation of my improved form of shovel; Fig. 8 is a top view thereof, and Fig. 9 is a vertical sectional view.

Referring now to the accompanying drawings in detail, and especially to Fig. 1, A represents as an entirety a derrick of any preferred type carrying the boom B, and extending longitudinally of said boom is shown a suitable cable C. Adapted to travel along this cable or way is a trolley 5 of any preferred type or form, said trolley being moved back and forth along the cable by the traction rope 6, the tails or ends of said rope being secured to the trolley frame so that the rope is substantially of an endless type. This traction rope 6 is wrapped over the drum D, the rope running over the sheave 7 of the standard 8, thence over the sheave 9 adjacent to the end of the boom, thence down to the trolley, and thence from the trolley around the sheave 10 and so on back to the drum. E designates a second drum for actuating the hoisting rope 11, the latter passing over the sheave 12 on the standard 8, thence to the sheave 13 near the end of the boom B, thence down and around the sheave 14 on the trolley and down and around the pulley 15 carried by the bail 16 of the shovel F, the hoisting rope being then looped and secured at 17 to the frame of the trolley or carriage 5.

For both loading and dumping the shovel, I employ a combined loading and dumping rope 18 which, for the sake of convenience, I will hereinafter designate as the loading rope, although as above stated it also performs the function of a loading and dumping line. This rope 18 is actuated by the drum G and such rope in Fig. 1 passes from the drum G over the sheave 19 beneath the sheave 20 and is secured to the front bail 21 of the shovel at the point 22. This shovel forms an important feature of the invention and is clearly shown in detail in Figs. 7, 8 and 9. The body of the shovel is provided with a front or loading end 23 and a rear or dumping end 24, said dumping end having the floor thereof slightly inclined to form a chute when the shovel is in its dumping position as is shown in Fig. 4, and at the same time such inclined section assists in retaining the material while the shovel is being loaded and hoisted.

The shovel supporting bail 16 comprises in its construction two arms pivoted at opposite sides of the shovel nearer to the dumping end than the loading end, for, as described, the load in the shovel is dumped or discharged at the end opposite to which it is loaded. The arms 25, in the construction shown, are turned inward at their upper or free ends as at 26 and are extended parallel to form a bearing for the sheave 15. The arms are shown as reinforced by the brace 27. The hauling bail 21 pivoted at the loading end of the shovel is provided in the present instance with a suitable ring 28 to which may be secured the combined loading and dumping rope or line 18. The pivoted bails 16 and 21 are suitably connected such as by means of the side chains 30, the latter being of such length so that when the shovel is in a suspended position as shown in Fig. 3 the two bails are drawn forward into approximately vertical position, the bail 16, the chain 30 and the bail 21 in this position forming an approximately inverted V-shaped support for the shovel and its load. In its hoisting position the entire shovel is supported from the hoisting rope for the purpose of hoisting and conveying, the loading and dumping rope 18 being slackened. While in such horizontal load-conveying position it is impossible for the load to be accidentally discharged as the shovel proper with its load is held in such approximately horizontal position through the bail 16, the chain 30 and the portion of the bail 21 below the point of connection of the chain 30 therewith. In other words the shovel is practically locked in its load-conveying position.

The above is a brief description of the mechanical construction of my apparatus as delineated in the preferred form shown in the drawings, and in describing the operation of the shovel, I would direct particular attention to Figs. 1, 2, 3 and 4. If it be desired to have the shovel cut and take a load it is first lowered into contact with the ground and occupies a position shown in Fig. 2, that is to say, with the loading line or rope drawn taut, the bail 21 extending forward, approximately parallel with the ground, the supporting bail 16 being also pulled forward through the connection 30, as the bail 21 is drawn into horizontal position by the line 18. By exerting tension, or hauling in, on the line 18 at the drum G the shovel is drawn forward to take the load, and, after loading the shovel, the line 18 is slackened and the hoisting rope 11 actuated by winding the same on the drum E so that the shovel is hoisted or elevated. As the hoisting line is tensioned it will of course have a tendency to pull the bail 16 to approximately vertical position and such bail through its connection with the front bail 21 will also pull the latter forward into approximately vertical position as is shown in Fig. 3. The load is then supported as heretofore described through the arrangement of the bails and connections, so that while being hoisted and conveyed the shovel will hang in proper position without the possibility of accidental dumping.

Assuming now that the load has been conveyed to the position where it is desired to discharge the same, it is only necessary to exert tension or strain upon the loading rope 18. By so doing the front bail is drawn forward and with it the bail 16. The result is that the loading end of the shovel is elevated, and this tipping causes the load to be discharged through the chute at the dumping end of the shovel. As soon as the load has been discharged the tension is relieved on the line 18 and the shovel assumes its normal horizontal position as shown in Fig. 3 and may then be moved for the next load and the operation resumed.

In Fig. 5 I have shown a construction wherein the trolley or carriage is adapted to travel along the boom, the latter being in the form of a trackway as is shown in cross section in Fig. 5ª. In this instance the boom is preferably made of two I-beams, the trolley comprising the frame 31 extending between the I-beams 32, 32 forming the boom, said frame 31 carrying the center sheave 33 and the trolley 34, the wheels 35 of which run on top of the I-beams.

It will be noted that I have provided an exceedingly simple and convenient excavating apparatus and one in which the cost of production and operation is reduced to a minimum. My novel arrangement of bails and connections insures the shovel against accidental discharge during transportation, for as heretofore stated, what may be termed an automatic locking effect is obtained when the bails are drawn upward, thus enabling the shovel to be raised and conveyed without any tendency to tip and discharge. Furthermore, it will be noted that during the hoisting of the shovel no tension whatsoever is maintained upon the loading line, the latter taking no part in maintaining the shovel in its approximately horizontal or non-dumping position. Such a structure as mine therefore possesses great advantages over those gravity-dump shovels which load and discharge at the same end and are maintained in non-dumping position during the hoisting by exerting tension upon the loading line, for, in such a case should the loading line accidentally slacken or break during the hoisting operation the shovel will tilt and prematurely discharge the load. Furthermore, while I load at one end and discharge at an opposite end, I dispense with tail gates at the discharge end, and consequently the means for closing and opening the gates such as latches and tail ropes, and I also avoid the use of an extra dumping rope. Furthermore I believe myself to be the first to have provided a receptacle such as a shovel, scraper bucket or the like which is loaded at one end and discharged at the opposite end by the application of pull or tension to a line or rope which combines the functions of a drag or loading rope and a discharge rope.

Having thus described my invention, what I claim is:

1. In combination, a receptacle having a loading end and a discharge end opposite the loading end, a combined loading and dumping line connected to the receptacle, means for applying tension to said line to load the receptacle and to discharge the same, and means for raising and lowering the receptacle.

2. In combination, a shovel having a loading end and a discharge end opposite the loading end, a supporting member movably connected to the shovel, a second member also movably connected to the shovel, means connecting the two members, a hoisting line for the shovel, and a combined loading and dumping line connected to the second member, whereby the load is taken at the loading end and dumped at the discharge end by tension applied to said loading and dumping line.

3. In combination a shovel having a loading end and a discharge end, a supporting member pivoted to the shovel nearer the discharge end than the loading end, a second member pivoted near the loading end, means connecting the pivoted members, a hoisting line for the shovel, and a combined loading and dumping line connected to the second member.

4. In combination a shovel having a loading end and a discharge end, a supporting bail for the shovel, a second bail at the loading end of the shovel, a loading and dumping rope connected to the second bail, and a connection between the two bails, the construction being such that the shovel may be loaded at the loading end, hoisted in horizontal position with the bails and connection maintaining it in such position, and dumped at the discharge end by operating the loading rope.

5. The combination with a shovel having a loading end and a discharge end opposite the loading end, a plurality of bails carried by said shovel, a hoisting rope connected to one of said bails, a combined loading and dumping rope connected to the other of said bails, and a flexible connection between the two bails.

6. The combination with a shovel having a loading end and an inclined discharge end, a bail pivoted nearer the discharge end than the loading end thereof, a member pivoted at the loading end, and a connection between the bail and said pivoted member.

7. The combination with a shovel having a loading end and a discharge end, a member pivoted adjacent to the loading end a bail pivoted nearer the discharge end than the loading end, the discharge end being constructed to form a chute, and a flexible connection between the bail and member.

8. The combination with a shovel having a loading end and a discharge end, a bail pivoted nearer the discharge end than the loading end, said discharge end having an inclined section, a sheave connected to the bail, a second bail pivoted at the loading end, a flexible connection between the two bails, and a combined loading and discharging rope connected to the bail at the loading end.

9. In combination a shovel having a loading end and a discharge end, a supporting bail pivoted nearer the discharge end than the loading end, a second bail pivoted adjacent to the loading end, a connection between the two bails connected to the supporting bail adjacent to the free end thereof and to the second bail at a point intermediate the ends thereof, and a combined loading and dumping rope connected to the second bail whereby said shovel is dumped by elevating its loading end by tension applied to said rope.

10. In combination a way, a carriage traveling thereon, a shovel having a loading end and a discharge end, a supporting bail pivoted nearer the discharge end than the loading end, a second bail pivoted near the loading end, a connection between the two bails, a hoisting line for the shovel and a combined loading and dumping rope connected to the second bail.

In testimony whereof I have hereunto signed my name to this specification in the presence of two subscribing witnesses.

JUDSON HAYWARD.

Witnesses:
R. B. CAVANAGH,
W. A. PAULING.